United States Patent
Anan et al.

(10) Patent No.: US 8,706,011 B2
(45) Date of Patent: Apr. 22, 2014

(54) DEVELOPING MEMBER, PROCESS CARTRIDGE, AND ELECTROPHOTOGRAPHIC APPARATUS

(71) Applicant: Canon Kabushiki Kaisha, Tokyo (JP)

(72) Inventors: Genya Anan, Numazu (JP); Masaki Yamada, Mishima (JP); Yuji Sakurai, Susono (JP); Toru Ishii, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/923,714

(22) Filed: Jun. 21, 2013

(65) Prior Publication Data

US 2013/0287454 A1    Oct. 31, 2013

Related U.S. Application Data

(63) Continuation of application No. PCT/JP2013/000847, filed on Feb. 15, 2013.

(30) Foreign Application Priority Data

Feb. 17, 2012  (JP) .................. 2012-033073
Feb. 8, 2013   (JP) .................. 2013-023251

(51) Int. Cl.
    *G03G 15/08*    (2006.01)
(52) U.S. Cl.
    USPC ............................................. 399/286
(58) Field of Classification Search
    USPC ............................................. 399/286
    See application file for complete search history.

(56) References Cited

U.S. PATENT DOCUMENTS

| | | | |
|---|---|---|---|
| 6,725,002 B2 | 4/2004 | Sakurai et al. | |
| 7,201,967 B2 | 4/2007 | Sakurai et al. | |
| 7,727,134 B2 | 6/2010 | Nakamura et al. | |
| 7,797,833 B2 | 9/2010 | Nakamura et al. | |
| 7,799,398 B2 | 9/2010 | Nakamura et al. | |
| 7,947,339 B2 | 5/2011 | Yamauchi et al. | |
| 7,979,004 B2 | 7/2011 | Tanaka et al. | |
| 8,503,916 B2 | 8/2013 | Anan et al. | |
| 2006/0226572 A1 | 10/2006 | Tanaka et al. | |
| 2012/0195631 A1 | 8/2012 | Yamada et al. | |
| 2013/0004211 A1 | 1/2013 | Ishii et al. | |
| 2013/0028634 A1 | 1/2013 | Koyanagi et al. | |
| 2013/0243480 A1 | 9/2013 | Sakurai et al. | |
| 2013/0279937 A1 | 10/2013 | Nakamura et al. | |

FOREIGN PATENT DOCUMENTS

| | | |
|---|---|---|
| JP | 7-199645 A | 8/1995 |
| JP | 2002-229346 A | 8/2002 |
| JP | 2006-313308 A | 11/2006 |
| JP | 2007-156435 A | 6/2007 |
| JP | 2008-107820 A | 5/2008 |
| JP | 2012-150453 A | 8/2012 |

OTHER PUBLICATIONS

PCT International Search Report and Written Opinion of the International Searching Authority, International Application No. JP2013/000847, Mailing Date Mar. 26, 2013.
Urushihara, et al., U.S. Appl. No. 13/770,796, filed Feb. 19, 2013.

*Primary Examiner* — Walter L Lindsay, Jr.
*Assistant Examiner* — Frederick Wenderoth
(74) *Attorney, Agent, or Firm* — Fitzpatrick, Cella, Harper Scinto

(57) ABSTRACT

Provided is a developing member capable of exerting stable performance under various environments. The developing member comprises a mandrel, an elastic layer formed on a periphery of the mandrel, and a surface layer covering a peripheral surface of the elastic layer. The surface layer contains a polyurethane and zinc oxide particles dispersed in the polyurethane, and the polyurethane has, between two adjacent urethane bonds, one or both of structures selected from structures according to the following item (A) and the following item (B): (A) a structure represented by the following structural formula (1), and one or both of structures selected from a structure represented by the following structural formula (2) and a structure represented by the following structural formula (3); and (B) a structure represented by the following structural formula (4).

—CH₂—CH₂—CH₂—CH₂—O—   Structural formula (1)

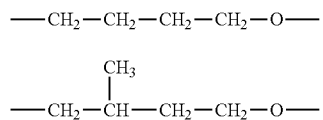

Structural formula (2)

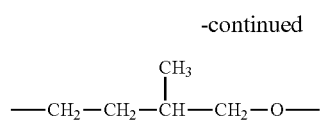

Structural formula (3)

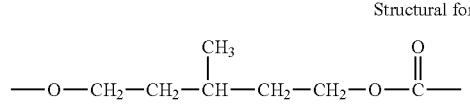

Structural formula (4)

13 Claims, 2 Drawing Sheets

DEVELOPING MEMBER, PROCESS CARTRIDGE, AND ELECTROPHOTOGRAPHIC APPARATUS

CROSS-REFERENCE TO RELATED APPLICATIONS

This application is a continuation of International Application No. PCT/JP2013/000847, filed Feb. 15, 2013, which claims the benefit of Japanese Patent Applications No. 2012-033073, filed on Feb. 17, 2012 and No. 2013-023251, filed on Feb. 8, 2013.

BACKGROUND OF THE INVENTION

1. Field of the Invention

The present invention relates to a developing member to be used in an electrophotographic apparatus, a process cartridge, and an electrophotographic apparatus.

2. Description of the Related Art

In an electrophotographic apparatus, main functions of a developing member to be used in contact development include, for example, a function of carrying a toner layer on its surface to convey toner to a developing region and a function of providing the toner with proper charge. In addition, in association with diversification of use environments of the electrophotographic apparatus, a developing member, in which such functions as described above do not largely vary depending on its surrounding environment and are stable, has been required.

To satisfy such requirement, Japanese Patent Application Laid-Open No. H07-199645 discloses a developing roller formed of a polyurethane having a low coefficient of water absorption, the developing roller being capable of providing toner with proper triboelectric charge even under a high-temperature and high-humidity environment.

SUMMARY OF THE INVENTION

The inventors of the present invention have investigated the developing roller according to Japanese Patent Application Laid-Open No. H07-199645. As a result, the inventors have confirmed that the developing roller shows good triboelectric charge-providing property for the toner under a high-temperature and high-humidity environment, e.g., a 30° C. and 85% RH environment.

However, the hardness of the surface of the developing roller increases under a low-temperature and low-humidity environment, e.g., a 15° C. and 10% RH environment, and in a developing process, an excessive stress is applied to the toner. As a result, the toner deteriorates, and by extension, the fusion of the deteriorated toner to the surface of the developing roller occurs in some cases.

In view of the foregoing, the inventors of the present invention have acknowledged that the development of a developing member satisfying the following requirements is important for achieving additional stabilization of an improvement in quality of an electrophotographic image according to the contact development:
1. the member can suppress the occurrence of fogging to the electrophotographic image under a high-temperature, high-humidity environment;
2. filming to its surface hardly occurs even under a low-temperature and low-humidity environment; and
3. a leak hardly occurs even when a high voltage is applied to a toner amount-regulating blade.

Therefore, the present invention is directed to providing a developing member satisfying the requirements 1 to 3 at high levels.

SOLUTION TO PROBLEM

According to one aspect of the present invention, there is provided a developing member, comprising: a mandrel; an elastic layer formed on a periphery of the mandrel; and a surface layer covering a peripheral surface of the elastic layer, wherein: the surface layer contains a polyurethane and zinc oxide particles dispersed in the polyurethane; and the polyurethane has, between two adjacent urethane bonds, one or both of structures selected from structures according to the following item (A) and the following item (B):

(A) a structure represented by the following structural formula (1), and one or both of structures selected from a structure represented by the following structural formula (2) and a structure represented by the following structural formula (3); and

Structural formula (1)

Structural formula (2)

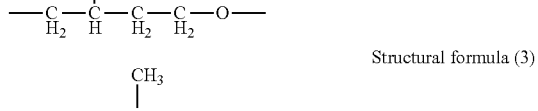
Structural formula (3)

(B) a structure represented by the following structural formula (4).

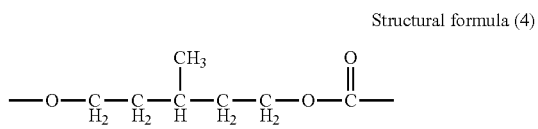
Structural formula (4)

According to the present invention, there is provided the developing member capable of stably exerting, under various environments, a function of conveying toner and a function of providing the toner with triboelectric charge.

Further, according to the present invention, provided are the electrophotographic apparatus and the process cartridge capable of stably providing high-quality electrophotographic images even under various environments.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
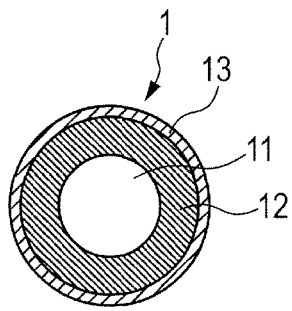
FIG. 1 is a sectional view illustrating an example of a developing member of the present invention.

FIG. 1 illustrates a schematic section of a roller-shaped developing member, i.e., developing roller according to the present invention. A developing roller 1 has a mandrel 11 formed of an electro-conductive material such as a metal, at least one elastic layer 12 formed on the outer peripheral surface of the mandrel 11, and one surface layer 13 laminated on the outer peripheral surface of the elastic layer 12.

<Mandrel 11>

Although the mandrel 11 is columnar in the figure, the mandrel may be of a hollow cylindrical shape. The developing roller 1 is generally used after an electrical bias has been applied to the roller or the roller has been grounded. In view of the foregoing, at least the surface of the mandrel 11 is preferably electro-conductive so that the mandrel can serve not only as a supporting member but also as an electro-conducting member. Therefore, at least the outer peripheral surface of the mandrel 11 is formed of a material having enough electro-conductivity to apply a predetermined voltage to the elastic layer 12 to be formed thereon. The following can be given as specific constructions of the mandrel:

a mandrel made of a metal or alloy such as Al, a Cu alloy, or SUS;

a mandrel made of iron whose surface is plated with Cr or Ni; and a mandrel made of a synthetic resin whose surface is plated with Cr or Ni.

In the developing roller to be used in an electrophotographic apparatus, it is proper to set the outer diameter of the mandrel 11 within the range of 4 mm to 10 mm in ordinary cases.

<Elastic Layer 12>

The elastic layer 12 is a molded body using a rubber or a resin as a raw material main component, and is formed on the periphery of the mandrel. It should be noted that various rubbers that have been used in developing rollers heretofore can each be used as the rubber serving as the raw material main component. Specific examples thereof include the following: an ethylene-propylene-diene copolymer rubber (EPDM), an acrylonitrile-butadiene rubber (NBR), a chloroprene rubber (CR), a natural rubber (NR), an isoprene rubber (IR), a stylene-butadiene rubber (SBR), a fluororubber, a silicone rubber, an epichlorohydrin rubber, a hydrogenated product of NBR, a polysulfide rubber, and an urethane rubber.

In addition, the resin as a raw material main component is typically a thermoplastic resin, and examples thereof include the following: polyethylene-based resins such as a low-density polyethylene (LDPE), a high-density polyethylene (HDPE), a linear low-density polyethylene (LLDPE), and an ethylene-vinyl acetate copolymer resin (EVA); polypropylene-based resins; polycarbonate resins; polystylene-based resins; ABS resins; polyimides; polyester resins such as polyethylene terephthalate and polybutylene terephthalate; fluororesins; and polyamide resins such as polyamide 6, polyamide 66, and MXD6.

In addition, one kind of those rubbers and resins may be used alone, or two or more kinds thereof may be used as a mixture.

Of those, a silicone rubber is particularly preferably used from the viewpoint of a compression set generated by press contact with various members. Examples of the silicone rubber may include a polydimethylsiloxane, a polymethyltrifluoropropylsiloxane, a polymethylvinylsiloxane, a polyphenylvinylsiloxane, and a copolymer of these polysiloxanes.

Further, in the developing roller of the present invention, the rubber material as a main component can be appropriately blended with a conductive agent or a non-conductive filler needed for a function demanded for the elastic layer itself, or with the various additive components to be utilized upon formation of a rubber or resin molded body such as a crosslinking agent, a catalyst, and a dispersion accelerator.

An ionic-conductive substance based on an ionic conduction mechanism and a conductivity-imparting agent based on an electronic conduction mechanism are each available as the conductive agent, and the two may be used in combination.

Examples of the electro-conductive agent based on an electronic conduction mechanism include the following: powders and fibers of metals such as aluminum, palladium, iron, copper, and silver; metal oxides such as titanium oxide, tin oxide, and zinc oxide; powders of metal compounds such as copper sulfide and zinc sulfide; powders obtained by causing tin oxide, antimony oxide, indium oxide, molybdenum oxide, zinc, aluminum, gold, silver, copper, chromium, cobalt, iron, lead, platinum, or rhodium to adhere onto surfaces of appropriate particles by an electrolytic treatment, spray coating, or mixing/shaking; and carbon black-based conductive agents such as acetylene black, ketchen black (trade name), PAN-based carbon black, pitch-based carbon black, and a carbon nanotube.

In addition, examples of the conductivity-imparting agent based on an ionicic conduction mechanism include the following: alkali metal salts such as $LiCF_3SO_3$, $NaClO_4$, $LiClO_4$, $LiAsF_6$, $LiBF_4$, NaSCN, KSCN, and NaCl; ammonium salts such as $NH_4Cl$, $NH_4SO_4$, and $NH_4NO_3$; alkaline earth metal salts such as $Ca(ClO_4)_2$ and $Ba(ClO_4)_2$; complexes of the above-mentioned salts with polyhydric alcohols such as 1,4-butanediol, ethylene glycol, a polyethylene glycol, propylene glycol, and a polypropylene glycol or derivatives thereof; complexes of the above-mentioned salts with monools such as ethylene glycol monomethyl ether, ethylene glycol monoethyl ether, a polyethylene glycol monomethyl ether, and a polyethylene glycol monoethyl ether; cationic surfactants such as a quaternary ammonium salt; anionic surfactants such as an aliphatic sulfonate, an alkyl sulfate, and an alkyl phosphate; and amphoteric surfactants such as betaine.

One kind of those conductive agents may be used alone, or two or more kinds thereof may be used as a mixture.

Alternatively, an approach involving adding a conductive polymer compound instead of the conductive agent or in addition to the conductive agent can be utilized as a process for imparting conductivity to the elastic layer.

The conductive polymer compound is a polymer compound obtained by doping a polymer having a conjugated system such as a polyacetylene as a host polymer with a dopant such as $I_2$ to make the polymer conductive.

Examples of the host polymer include the following: a polyacetylene, a poly(p-phenylene), a polypyrrole, a polythiophene, a poly(p-phenylene oxide), a poly(p-phenylene sulfide), a poly(p-phenylene vinylene), a poly(2,6-dimethylphenylene oxide), a poly(bisphenol A carbonate), a polyvinylcarbazole, a polydiacetylene, a poly(N-methyl-4-vinylpyridine), a polyaniline, a polyquinoline, and a poly(phenylene ether sulfone).

Of those, a carbon black-based conductive agent is suitable because the conductive agent can be relatively easily obtained at a relatively low cost, and can impart good conductivity irrespective of the kinds of the rubber and resin materials as main components. Each of the following processes that have been utilized heretofore has only to be appropriately utilized as processes for dispersing a fine powdery conductive agent in the rubber and resin materials as main components according to the rubber and resin materials as main components. Examples of the processes include a roll kneader, a Banbury mixer, a ball mill, a sand grinder, and a paint shaker.

Examples of the filler and the extender include the following: silica, quartz fine powder, diatomaceous earth, zinc oxide, basic magnesium carbonate, activated calcium carbonate, magnesium silicate, aluminum silicate, titanium dioxide, talc, mica powder, aluminum sulfate, calcium sulfate, barium sulfate, glass fiber, an organic reinforcement, and an organic filler. The surface of each of those fillers may be treated with an organosilicon compound so as to be made hydrophobic.

A known antioxidant to be used for a polymer compound such as a hindered phenol-based antioxidant, a phenol-based antioxidant, a phosphorus-based antioxidant, an amine-based antioxidant, or a sulfur-based antioxidant can be appropriately selected and used as an antioxidant.

A known material can be used as a processing aid. Specifically, a fatty acid such as stearic acid or oleic acid, or a metal salt or ester of such fatty acid can be used.

For example, when a rubber molded body is produced with a silicone rubber, a liquid silicone rubber is used as a main agent, a polyorganohydrogensiloxane is used as a crosslinking component, and a platinum-based catalyst is used to crosslink the molecules of the rubber component.

Although the elastic layer in the present invention can be molded by, for example, a conventionally known extrusion molding method or injection molding method, a method for the molding is not particularly limited. The construction of the layer is not limited as long as the layer has the features described in the present invention, and a construction having two or more elastic layers is also permitted.

<Surface Layer 13>

The surface layer 13 contains a polyurethane and zinc oxide particles dispersed in the polyurethane.

<<Polyurethane>>

The polyurethane according to the present invention has, between two adjacent urethane bonds, one or both of the structures according to the following items (A) and (B):
(A) a structure represented by the structural formula (1), and one or both of structures selected from a structure represented by the structural formula (2) and a structure represented by the structural formula (3); and

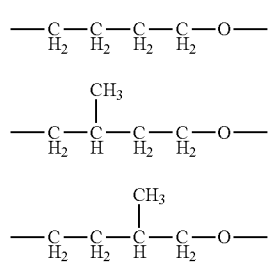

Structural formula (1)

Structural formula (2)

Structural formula (3)

(B) a structure represented by the structural formula (4).

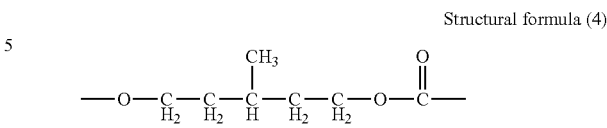

Structural formula (4)

More specifically, the polyurethane according to the present invention has, between two adjacent urethane bonds, such structures as described below:
(i) the structures represented by the structural formulae (1) and (2);
(ii) the structures represented by the structural formulae (1) and (3);
(iii) the structures represented by the structural formulae (1), (2), and (3);
(iv) the structures represented by the structural formulae (1), (2), and (4);
(v) the structures represented by the structural formulae (1), (3), and (4); or
(vi) the structures represented by the structural formulae (1), (2), (3), and (4).

Figure 4:
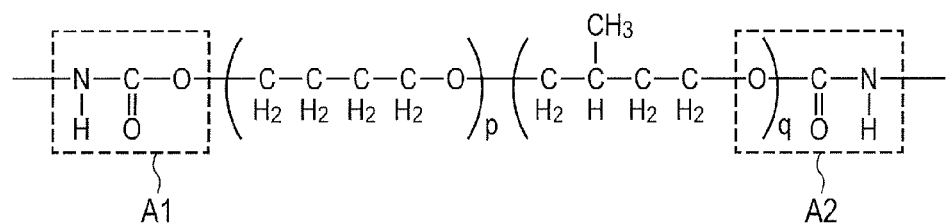
FIG. 4 is an explanatory diagram of a chemical structure of an example of a polyurethane according to the present invention.
Figure 5:
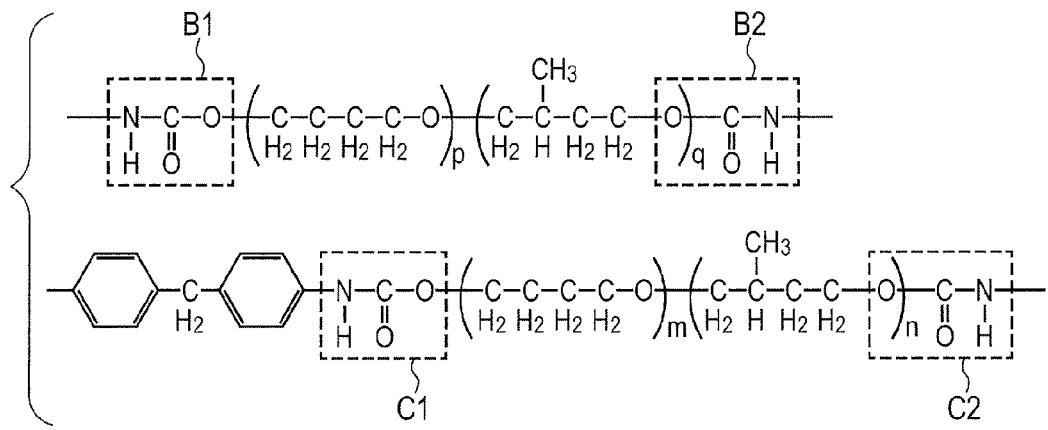
FIG. 5 is an explanatory diagram of a chemical structure of another example of the polyurethane according to the present invention.

FIG. 4 and FIG. 5 each illustrate part of a structure which a specific example of the polyurethane according to the item (i) has.

In FIG. 4, the structure represented by the structural formula (1) and the structure represented by the structural formula (2) are sandwiched between adjacent urethane bonds A1 and A2.

In FIG. 5, the structure represented by the structural formula (1) and the structure represented by the structural formula (2) are sandwiched between adjacent urethane bonds B1 and B2, and the structure represented by the structural formula (1) and the structure represented by the structural formula (2) are sandwiched between adjacent urethane bonds C1 and C2. In FIG. 4 and FIG. 5, p, q, m, and n each independently represent a positive integer. It should be noted that the structures illustrated in FIG. 4 and FIG. 5 are examples, and the polyurethane according to the present invention is not limited to these structures.

The polyurethane according to the present invention shows extremely low polarity for a polyurethane as compared with a conventional polyurethane because a methyl group is introduced into a side chain thereof. Accordingly, a remarkable rise in adhesiveness of the surface of the roller can be suppressed even in a severe high-temperature, high-humidity environment (having, for example, a temperature of 40° C. and a relative humidity of 95% RH). As a result, a change in toner-conveying property of the developing member with time due to the sticking of toner to the surface of the developing member can be suppressed.

Further, a methyl group introduced into a side chain of the polyurethane reduces the orientation regularity of the polyurethane, and as a result, its crystallinity is remarkably low particularly under a low-temperature environment. Accordingly, a developer carrying member including a surface layer containing such polyurethane is flexible and its hardness hardly increases even under, for example, a low-temperature environment having a temperature of 0° C. As a result, the recovery of the shape of a polyurethane particle in the surface layer after the release of a pressing force by a regulating blade is hardly inhibited.

Further, the polyurethane according to the present invention has, in a molecule thereof, the structure represented by any one of the structural formulae (2) to (4) having higher hydrophobicity than that of the structure represented by the structural formula (1). Accordingly, the affinity of the polyurethane itself for water reduces and hence the polyurethane can be relatively low water-absorbing property for a polyurethane. Further, in a high-temperature region, the presence of a methyl group as a side chain in each of the structures represented by the structural formula (2), the structural formula (3), and the structural formula (4) suppresses the molecular mobility of the polyurethane in the high-temperature region. Accordingly, the adhesiveness of the surface of the developing roller according to the present invention hardly rises even under a high-temperature, high-humidity environment, and hence the sticking of the toner to the surface of the developing roller under the high-temperature, high-humidity environment can be effectively suppressed.

In addition, a developing member including a surface layer containing a polyurethane having low water-absorbing property can provide the toner with proper triboelectric charge and hence can effectively suppress the occurrence of fogging to an electrophotographic image even under a high-temperature, high-humidity environment.

In contrast, after a developer carrying member obtained by using a general polyurethane as a matrix polymer has been left to stand in a high-temperature, high-humidity environment for a long time period, the adhesiveness of its surface rises and hence toner is liable to stick to the surface of the developer carrying member. As a result, the toner-conveying property of the developer carrying member becomes unstable and hence a high-quality electrophotographic image is not obtained in some cases.

The polyurethane according to the present invention is obtained by causing a polyol having at least one of the structures according to the items (A) and (B) in a molecule thereof, and an isocyanate compound to react with each other.

In this case, the component according to the item (A) is specifically a polyether polyol obtained by the ring-opening copolymerization of tetrahydrofuran and 3-methyl-tetrahydrofuran. A polyether in which the structures represented by the structural formulae (1) and (2) or (3) are randomly copolymerized is preferred because the crystallinity-reducing effect becomes additionally high.

In addition, a ratio "the number of moles of the structure represented by the structural formula (1)":"the total sum of the number of moles of the structure represented by the structural formula (2) and the number of moles of the structure represented by the structural formula (3)" is preferably 50:50 to 80:20. When the molar ratio between the respective structural formulae falls within the range, the developing roller is particularly excellent in flexibility in a low-temperature region and hence its filming resistance becomes good.

On the other hand, the component according to the item (B) is specifically a component derived from a polyester polyol obtained by a condensation reaction of 3-methyl-1,5-pentanediol and a dicarboxylic acid such as succinic acid, glutaric acid, adipic acid, pimelic acid, suberic acid, azelaic acid, sebacic acid, terephthalic acid, fumaric acid, or maleic acid. The dicarboxylic acid is preferably adipic acid, pimelic acid, suberic acid, azelaic acid, or sebacic acid from the viewpoint of flexibility.

The polyurethane to be incorporated into the surface layer covering the peripheral surface of the elastic layer of the present invention is obtained by causing a hydroxyl group-terminated polyol of a polyether component according to the item (A) and/or a polyester component according to the item (B) to react with the isocyanate compound.

In addition, the polyether component according to the item (A) and the polyester component according to the item (B) may each be used alone, or both the components may be used as a mixture.

The number-average molecular weight of the polyether component or the polyester component is preferably 1,000 or more and 3,000 or less. When the number-average molecular weight falls within the range, a balance between the flexibility of the polyurethane and its compatibility with an acrylic resin is excellent, and hence both the deformation recoverability of the developing roller under high temperatures and its filming resistance under low temperatures become good.

The polyether component according to the item (A) or the polyester component according to the item (B) may be turned into a hydroxyl group-terminated polyurethane polyol, whose chain has been extended with a diisocyanate as required, and then cured with a polyisocyanate. When such component is used as a hydroxyl group-terminated polyurethane polyol whose chain has been extended in advance, a difference in polarity between the component and the polyisocyanate can be reduced. Accordingly, compatibility between the polyol and the isocyanate is improved, and hence the remaining of an unreacted polyol can be suppressed to an extremely low level with a lower isocyanate ratio than a conventional one.

As a diisocyanate species to be used for the chain extension, there are given 2,4-tolylene diisocyanate (TDI), 1,4-diphenylmethane diisocyanate (MDI), and isophorone diisocyanate (IPDI).

When such component is used as a hydroxyl group-terminated prepolymer, the number-average molecular weight of the prepolymer is preferably 8,000 or more and 15,000 or less from the viewpoint of the flexibility.

A polypropylene glycol, a polytetramethylene glycol, or a polyester polyol free of the structure represented by the structural formula (4) may be incorporated between two adjacent urethane bonds as required in addition to the structures according to the item (A) and the structure according to the item (B) to such an extent that an effect of the present invention is not impaired.

Examples of the polyester polyol include an aliphatic polyester polyol obtained by a condensation reaction of a diol component such as 1,4-butanediol or neopentyl glycol or a triol component such as trimethylolpropane, and a dicarboxylic acid such as glutaric acid, adipic acid, or sebacic acid.

The polyol component may be formed in advance into a prepolymer through chain extension with an isocyanate species such as 2,4-tolylene diisocyanate (TDI), 1,4-diphenylmethane diisocyanate (MDI), or isophorone diisocyanate (IPDI) as required.

The content of the components except the polyether component according to the item (A) and the polyester component according to the item (B) in the polyurethane is preferably 20 mass % or less from the viewpoint of exerting the effect of the present invention. The isocyanate compound to be caused to react with the polyol component is not particularly limited, and there may be used: aliphatic polyisocyanates such as ethylene diisocyante and 1,6-hexamethylene diisocyante (HDI); alicyclic polyisocyanates such as isophorone diisocyanate (IPDI), cyclohexane 1,3-diisocyanate, and cyclohexane 1,4-diisocyanate; aromatic isocyanates such as 2,4-tolylene diisocyanate, 2,6-tolylene diisocyanate (TDI), 4,4'-diphenylmethane diisocyanate (MDI), polymeric diphenylmethane diisocyanate, xylylene diisocyanate, and naphthalene diisocyanate; and a copolymer thereof, an isocyanurate thereof, a TMP adduct thereof, a biuret compound thereof, and a block compound thereof.

Of those, there are more suitably used aromatic isocyanates such as tolylene diisocyanate, diphenylmethane diisocyanate, and polymeric diphenylmethane diisocyanate. A polyurethane containing an aromatic isocyanate is preferred because the polyurethane is excellent in strength and has low adhesiveness under high temperature and high humidity.

A mixing ratio of the isocyanate compound to be caused to react with the polyol component in terms of an isocyanate group ratio preferably falls within the range of 1.2 to 4.0 with respect to 1.0 of a hydroxyl group of the polyol.

The isocyanate compound is preferably turned into an isocyanate group-terminated polyurethane prepolymer modified with a polyol formed of the polyether component according to the item (A) or the polyester component according to the item (B) and then subjected to a curing reaction with the polyol. When the compound is turned into the isocyanate group-terminated polyurethane prepolymer, its compatibility with the polyol component improves, and hence a polyurethane which is additionally flexible and in which the remaining of an unreacted component is suppressed is obtained.

When the isocyanate compound is used as the isocyanate group-terminated polyurethane prepolymer in advance, the number-average molecular weight of the polyether component according to the item (A) or the polyester component according to the item (B) is particularly preferably 1,000 or more and 3,000 or less. When the number-average molecular weight falls within the range, a balance between the flexibility and the suppression of the production of the unreacted component becomes particularly good.

<<Zinc Oxide Particles>>

The zinc oxide particles incorporated into the surface layer in a state of being dispersed in the polyurethane according to the present invention are described.

The polyurethane having the structure represented by the structural formula (1) and one or both of the structures selected from the structures represented by the structural formulae (2) and (3), or the polyurethane having the structure represented by the structural formula (4) has high hydrophobicity. As described in the foregoing, the use of the polyurethane having such characteristic as a matrix resin in a surface layer provides a developing member in which the adhesiveness of the surface of the surface layer hardly rises even under high-temperature, high-humidity conditions, and which can exert stable triboelectric charge-providing performance for toner. However, as a result of a further investigation conducted by the inventors of the present invention, it has been found that the characteristic of the polyurethane according to the present invention causes, in the surface layer, a leak point into which a current locally flows, and the leak point can be responsible for the occurrence of a horizontal streak-like defect in an electrophotographic image.

That is, in the surface layer containing the polyurethane having high hydrophobicity as a matrix resin, a reduction in amount of moisture contributing to the expression of ionic conductivity may be responsible for the occurrence of the leak point.

In view of the foregoing, the inventors of the present invention have made further studies with a view to solving the problem resulting from the polyurethane according to the present invention. As a result, the inventors have found that the dispersion of the zinc oxide particles in the surface layer containing the polyurethane according to the present invention as a matrix resin alleviates the voltage dependence of the developing roller and hence can reduce the flow of a current from a contacting member into a charging member.

The reason why the incorporation of the zinc oxide particles into the surface layer provides the effect is assumed as follows: the zinc oxide particles have extremely large nonlinear voltage-current characteristics, i.e., so-called varistor characteristics, and hence suppress the leakage of a current when a high voltage is locally applied to the surface layer 13.

Although the particle diameter of the zinc oxide particles is not particularly limited, their average primary particle diameter is preferably 20 to 600 nm. Setting the average primary particle diameter within the range facilitates additionally uniform dispersion of the particles in the surface layer and hence suppresses the occurrence of the leak point in an additionally effective manner. In this case, the average primary particle diameter is a value converted from the specific surface area of the zinc oxide particles.

In addition, with regard to the content of the zinc oxide particles in the resin layer, for example, when zinc oxide particles having an average primary particle diameter of 20 to 50 nm are used, the content of the zinc oxide particles is desirably 23 to 46 parts by mass with respect to 100.0 parts by mass of the resin solid content in the resin layer.

In addition, when zinc oxide particles having an average primary particle diameter of 50 to 100 nm are used, the content of the zinc oxide particles is preferably 10 to 60 parts by mass with respect to 100.0 parts by mass of the resin solid content in the resin layer.

In addition, when zinc oxide particles having an average primary particle diameter of 100 to 600 nm are used, the content of the zinc oxide particles is preferably 10 to 46 parts by mass with respect to 100.0 parts by mass of the resin solid content in the resin layer.

Zinc oxide particles subjected to, for example, an inorganic treatment involving causing silica to adhere to their surfaces or an organic treatment involving coating the surfaces with a polysiloxane can be used as the zinc oxide particles generally from the viewpoint of the suppression of blocking. Further, zinc oxide particles doped with an element such as aluminum or gallium for improving their conductivity can be used.

It should be noted that depending on the specifications of the developing roller, the zinc oxide particles, and conductive substances such as conductive fine particles and an ionic conductive agent may be used in combination for obtaining proper electrical characteristics.

When the developing roller needs to have a surface roughness, fine particles for roughness control may be added to the surface layer 13. The volume-average particle diameter of the fine particles for roughness control is preferably 3 to 20 μm. In addition, the addition amount of the particles to be added to the surface layer is preferably 10 to 100 parts by mass with respect to 100 parts by mass of the resin solid content of the surface layer. Fine particles of a polyurethane, a polyester resin, a polyether resin, a polyamide resin, an acrylic resin, and a phenol resin can be used as the fine particles for roughness control.

The developing member of the present invention is useful as a developing member for a process cartridge in an electrophotographic apparatus using the process cartridge, and is useful as a developing member for an electrophotographic apparatus such as a copying machine, a facsimile, or a printer.

<Process Cartridge and Electrophotographic Image Forming Apparatus>

Figure 2:
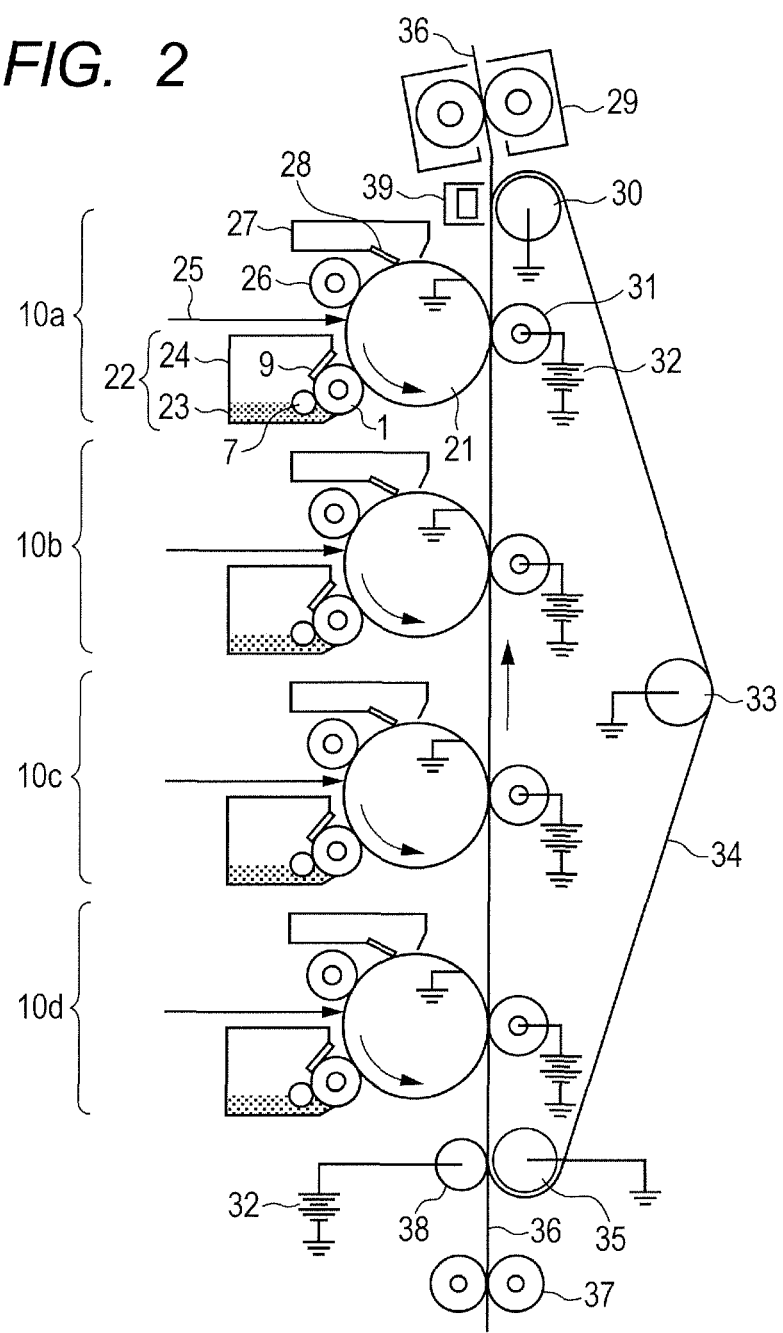
FIG. 2 is a schematic view illustrating an example of each of a process cartridge and an electrophotographic image forming apparatus on each of which the developing member of the present invention is mounted.

FIG. 2 illustrates a schematic view of an example of each of the process cartridge and electrophotographic image forming apparatus of the present invention.

A process cartridge 22 of the present invention is constituted of at least the developing roller 1, a toner-supplying roller 7 for supplying toner 23 stored in a toner container 24 to the developing roller 1, and a toner amount-regulating blade 9 for regulating a toner conveyance amount on the developing roller 1. In addition, in an example, the process cartridge 22 includes the developing roller 1 and an electrophotographic photosensitive member (photosensitive drum) 21 placed to be in contact with or close to the developing roller 1, and is detachably mountable to the main body of an electrophotographic apparatus.

The developing roller 1 is mounted in a state of being placed to be in contact with or close to the photosensitive drum 21 and the toner-supplying roller 7. An electrostatic latent image is formed by laser light 25 on the photosensitive drum 21 charged by a charging member 26, and the electrostatic latent image is visualized with the toner carried and conveyed by the developing roller 1 to form a toner image. Then, the toner remaining on the photosensitive drum 21 is scraped off by a cleaning blade 28 and scraped down into a waste toner container 27.

In this case, the toner-supplying roller 7 is preferably an elastic roller member made of, for example, a resin, rubber, or sponge. Of those, an elastic roller constituted of a foamed polyurethane is more preferred in terms of durability, hardness, and triboelectric charge-providing property for the toner. A belt member or a brush member can also be used as the toner-supplying roller instead of the elastic roller. When the toner that has not been moved to the photosensitive drum 21 so as to be used in development is stripped from the surface of the developing roller once by the toner-supplying roller 7, the occurrence of immovable toner on the developing roller is inhibited and hence the charging of the toner is uniformized.

Next, the toner to be used in the process cartridge of the present invention is described.

The so-called pulverized toner produced through pulverizing and classifying steps, and the so-called polymerized toner directly produced from a polymerizing step of producing resin particles can each be used as the toner that can be used in image formation involving using the developing roller according to the present invention. Of those, the polymerized toner is preferred for the production of toner having a uniform shape and a small particle diameter because the toner can be produced while its particle diameter and shape are controlled in its production step.

Although the volume-average particle diameter and average circularity of the toner are not particularly limited, the volume-average particle diameter is more preferably 4 to 8 μm and the average circularity (S) more preferably satisfies a relationship of $0.960 \leq S \leq 1.000$ because a high-resolution, high-definition image can be easily formed.

It should be noted that the volume-average particle diameter of the toner can be measured by the following method.

A Coulter Multisizer III (trade name: manufactured by Beckman Coulter) was used. A 1% aqueous solution of NaCl may be prepared as an electrolyte by using first-grade sodium chloride, or an ISOTON R-II (trade name: manufactured by Beckman Coulter) or the like may be used. One milliliter of a surfactant (preferably an alkylbenzene sulfonate) is added as a dispersant to 100 to 150 ml of the electrolyte, and then 10 mg of a measurement sample are further added thereto. The electrolyte in which the measurement sample has been suspended is subjected to a dispersion treatment with an ultrasonic disperser for about to 3 minutes. The 16-channel volume particle size distribution of the electrolyte subjected to the ultrasonic treatment as a measurement sample in the range of 1.59 μm to 64.00 μm is measured with a Coulter Multisizer adopting a 100-μm aperture, and then the measured 50% D diameter is defined as the volume-average particle diameter.

Meanwhile, with regard to the average circularity (S) of the toner, a value determined from the following equation after measurement with a flow-type particle image-measuring apparatus Type FPIA-2000 (trade name: manufactured by SYSMEX CORPORATION) can be adopted as an indicator for simply and quantitatively representing the sphericity of the toner.

$$\text{Equivalent circle diameter} = (\text{particle projected area}/n)^{1/2} \times 2$$

$$\text{Circularity} = (\text{Circumferential length of circle having the same area as particle projected area})/(\text{circumferential length of particle projected image}) \quad \text{(Equation)}$$

Next, the toner amount-regulating blade 9 to be used in the process cartridge of the present invention is described.

Used as a blade for regulating the layer thickness of the toner on the developing roller 1 is the toner amount-regulating blade 9 made of a material having rubber elasticity such as a urethane rubber or a silicone rubber, or of a material having metal elasticity such as phosphor bronze or stainless copper.

When the toner amount-regulating blade 9 is brought into press contact with the developing roller 1 in a posture opposite to the rotation direction of the developing roller 1, an additionally thin toner layer can be formed on the developing roller 1. The toner amount-regulating blade 9 preferably has a particularly stable regulating force and conductivity for stably providing the toner with (negative) charge, and stainless copper is more preferably used.

The contact pressure of the toner amount-regulating blade 9 against the developing roller 1 is preferably 5 g/cm to 50 g/cm in terms of a linear pressure because the regulation of the toner is stabilized and the toner layer thickness can be suitably adjusted.

Setting the contact pressure of the toner amount-regulating blade 9 within the range can suppress fogging and a toner leakage due to the weakening of the regulation of the toner. In addition, the setting suppresses damage to the toner caused by the application of an excessive pressure to the toner, and hence can suppress the deterioration of the toner, and the fusion of the toner to each of the developing roller and the blade.

A color electrophotographic image forming apparatus illustrated in the schematic view of FIG. 2 has image forming portions 10a to 10d provided for the toners of respective colors, i.e., yellow Y, magenta M, cyan C, and black BK in a tandem form. The image forming portions 10a to 10d are identical to one another in basic construction, though the portions slightly differ from one another in specifications according to the characteristics of the respective color toners. In addition, the image forming portions 10a to 10d are each detachably mountable to the electrophotographic image forming apparatus. Meanwhile, the color electrophotographic image forming apparatus is not limited to the tandem form, and may adopt a rotary form in which a process cartridge for each color is placed around a photosensitive drum incorporated into the main body of the electrophotographic image forming apparatus and a required color is developed while being rotated.

Provided is a transfer member having a transfer roller 31 for transferring the toner image on the photosensitive drum 21 onto a recording medium 36 such as paper, which is supplied by a sheet-feeding roller pair 37 and conveyed by a conveying belt 34, through the application of a voltage from a bias power source 32 from the back surface of the recording medium 36. The conveying belt 34 is suspended by a driver roller 30, a driven roller 35, and a tension roller 33, and is controlled so as to move in synchronization with the respective image forming portions to convey the recording medium 36 so that the toner images formed by the image forming portions may be sequentially transferred onto the recording medium 36 in a superimposed manner. It should be noted that the recording medium 36 is electrostatically adsorbed to the conveying belt 34 through the action of an adsorbing roller 38 provided immediately in front of the conveying belt 34 and then conveyed.

Further, the color electrophotographic image forming apparatus is provided with a fixing unit 29 for fixing the toner images transferred onto the recording medium 36 in a superimposed manner through heating or the like, and a conveying unit (not shown) for discharging the recording medium on which the images have been formed to the outside of the apparatus. It should be noted that the recording medium 36 is peeled from the conveying belt 34 through the action of a peeling unit 39 and then fed to the fixing unit 29.

EXAMPLES

Hereinafter, the present invention is described in more detail by way of examples. However, the present invention is not limited to these examples.

Preparation Example of Elastic Roller

The following materials were blended to prepare a base material for a liquid silicone rubber:
Dimethylpolysiloxane having vinyl groups at both of its terminals (vinyl group content: 0.15 mass %, molecular weight: 50,000 cp): 100 parts by mass;
Quartz powder as filler (trade name: Min-USil; manufactured by Pennsylvania Glass Sand Company): 7 parts by mass; and
Carbon black (trade name: DENKA BLACK, powdery product; manufactured by DENKI KAGAKU KOGYO KABUSHIKI KAISHA): 10 parts by mass.

A liquid A was prepared by blending the base material with 0.5 part by mass of a solution (0.5 mass %) of a complex of chloroplatinic acid and divinyltetramethyldisiloxane as a curing catalyst. In addition, a liquid B was prepared by blending the base material with 1.5 parts by mass of a dimethylsiloxane-methylhydrogensiloxane copolymer having Si—H groups at both of its terminals (content of H bonded to an Si atom: 0.30 mass %).

Placed at the central portion of a cylindrical die was a columnar mandrel made of SUM material whose surface had been subjected to a primer treatment, and which had a diameter of 6 mm and a length of 250 mm. A mixture containing the liquid A and the liquid B at a mass ratio of 1:1 was injected into the die. The resultant was thermally cured at a temperature of 130° C. for 20 minutes, and was then thermally cured at a temperature of 200° C. for an additional four hours to provide an elastic roller having an elastic layer having a length of 240 mm and a thickness of 3 mm.

Preparation Example of Surface Layer

A synthesis example for obtaining the polyurethane of the present invention is described below.
(Measurement of Molecular Weight of Copolymer)
An apparatus used in the measurement of number average molecular weight (Mn) and weight average molecular weight (Mw) in this example, and conditions for the measurement are as described below;
Measuring instrument: HLC-8120GPC (manufactured by TOSOH CORPORATION)
Column: Two TSKgel SuperHZMM (manufactured by TOSOH CORPORATION)
Solvent: THF (having added thereto 20 mmol/L of triethylamine)
Temperature: 40° C.
Flow rate of THF: 0.6 ml/min It should be noted that a measurement sample was a 0.1-mass % THF solution. Further, the measurement was performed with a refractive index (RI) detector as a detector.

A calibration curve was created with TSK Standard Polystyrenes A-1000, A-2500, A-5000, F-1, F-2, F-4, F-10, F-20, F-40, F-80, and F-128 (manufactured by TOSOH CORPORATION) as standard samples for creating the calibration curve. The weight average molecular weight was determined from the retention time of the measurement sample obtained based on the curve.

Example A-1

Synthesis of Polyether Polyol A-1

In a reaction vessel, the temperature of the mixture of 230.7 g (3.2 mol) of dry tetrahydrofuran and 68.9 g (0.8 mol) of dry 3-methyltetrahydrofuran (molar mixing ratio: 80/20) was held at 10° C. 13.1 Grams of 70% perchloric acid and 120 g of acetic anhydride were added to perform a reaction for 2.5 hours. Next, the reaction mixture was poured into 600 g of a 20% aqueous solution of sodium hydroxide to be purified. Further, the remaining water and solvent component were removed under reduced pressure to provide 218 g of a liquid polyether polyol A-1. The polyol had a hydroxyl value of 57.0 mgKOH/g and a number-average molecular weight of about 2,000.

Example A-2

Synthesis of Hydroxyl Group-Terminated Polyether Urethane Polyol A-2

Under a nitrogen atmosphere, in a reaction vessel, 28.4 parts by mass of diphenylmethane diisocyanate (trade name: Cosmonate MDI; manufactured by Mitsui Chemicals, Inc.) were dissolved in 50.0 parts by mass of methyl ethyl ketone. Next, a solution of 200.0 g of the polyether polyol A-1 in 178.4 parts by mass of methyl ethyl ketone was gradually dropped while the temperature in the reaction vessel was held at 65° C. After the completion of the dropping, the mixture was subjected to a reaction at a temperature of 75° C. for 3 hours. The resultant reaction mixture was cooled to room temperature to provide 226 g of a hydroxyl group-terminated polyether urethane polyol A-2. The polyol had a hydroxyl value of 6.0 mgKOH/g and a number-average molecular weight of about 15,000.

Example A-3

Synthesis of Hydroxyl Group-Terminated Polyester Urethane Polyol A-3

244 Grams of a hydroxyl group-terminated polyester urethane polyol A-3 were obtained under the same conditions except that the polyether polyol A-1 was changed to a polyester diol (trade name: KURARAY POLYOL P-2010; manufactured by KURARAY CO., LTD.). The polyol had a hydroxyl value of 6.2 mgKOH/g and a number-average molecular weight of 15,000. Table 1 shows the respective polyols obtained in the foregoing.

TABLE 1

| Example | Polyol | Incorporated structural formula |
|---|---|---|
| A-1 | Polyether polyol | (1) (2) (3) |
| A-2 | Hydroxyl group-terminated polyether urethane polyol | (1) (2) (3) |
| A-3 | Hydroxyl group-terminated polyether urethane polyol | (4) |

Example B-1

Synthesis of Isocyanate Group-Terminated Polyurethane Prepolymer B-1

Under a nitrogen atmosphere, in a reaction vessel, 76.7 parts by mass of a polymeric MDI (trade name: Millionate MT; manufactured by Nippon Polyurethane Industry Co., Ltd.) as an isocyanate species were dissolved in 80.0 parts by mass of methyl ethyl ketone. Next, a solution of 200.0 g of the polyether polyol A-1 as a polyol species in 70.0 parts by mass of methyl ethyl ketone was gradually dropped while the temperature in the reaction vessel was held at 65° C. After the completion of the dropping, the mixture was subjected to a reaction at a temperature of 65° C. for 2 hours. The resultant reaction mixture was cooled to room temperature to provide 229 g of an isocyanate group-terminated polyurethane prepolymer B-1 having an isocyanate group content of 4.7% and a solid content of 65%.

Example B-2

Synthesis of Isocyanate Group-Terminated Polyurethane Prepolymer B-2

233 Grams of an isocyanate group-terminated polyurethane prepolymer B-2 having an isocyanate group content of 4.8% and a solid content of 65% were obtained in the same manner as in Example B-1 except that the polyether polyol A-1 as a polyol species was changed to a polyester diol (trade name: KURARAY POLYOL P-2010; manufactured by KURARAY CO., LTD.).

Example B-3

Synthesis of Isocyanate Group-Terminated Polyurethane Prepolymer B-3

Under a nitrogen atmosphere, in a reaction vessel, 69.6 parts by mass of a tolylene diisocyanate (TDI) (trade name: Cosmonate 80; manufactured by Mitsui Chemicals, Inc.) as an isocyanate species were dissolved in 80.0 parts by mass of methyl ethyl ketone. Next, a solution of 200.0 g of a polypropylene glycol-based polyol (trade name: Excenol 1030; manufactured by Sanyo Chemical Industries, Ltd.) as a polyol species in 70.0 parts by mass of methyl ethyl ketone was gradually dropped while the temperature in the reaction vessel was held at 65° C. After the completion of the dropping, the mixture was subjected to a reaction at a temperature of 65° C. for 2 hours. The resultant reaction mixture was cooled to room temperature to provide 244 g of an isocyanate group-terminated polyurethane prepolymer B-3 having an isocyanate group content of 4.3% and a solid content of 65%.

Table 2 shows the synthesis examples of the isocyanate group-terminated polyurethane prepolymers obtained in the foregoing.

TABLE 2

| Example | Polyol species | Isocyanate species | Incorporated structural formula |
|---|---|---|---|
| B-1 | A-1 | Polymeric MDI | (1) (2) (3) |
| B-2 | Polyester diol | Polymeric MDI | (4) |
| B-3 | Polypropylene glycol-based polyol | TDI | — |

Table 3 below shows examples of zinc oxide particles used in respective examples and comparative examples.

TABLE 3

| Zinc oxide particles No. | Trade name and the like |
|---|---|
| 1 | Zinc oxide ultrafine particles (trade name: Zincox Super F-3; manufactured by HakusuiTech Co., Ltd., specific surface area = 20 m$^2$/g, average primary particle diameter (*1) = 50 nm) |
| 2 | Zinc oxide particles (trade name: Zincox Super F-2; manufactured by HakusuiTech Co., Ltd., specific surface area = 15 m$^2$/g, average primary particle diameter (*1) = 65 nm) |
| 3 | Conductive zinc oxide (trade name: Pazet CK; manufactured by HakusuiTech Co., Ltd., specific surface area = 30 to 50 m$^2$/g, average primary particle diameter (*1) = 30 nm, volume resistivity (*2) = 5 × 10$^3$ to 2 × 10$_4$ Ω · cm) |
| 4 | Zinc oxide particles (trade name: Fine Zinc Oxide; manufactured by Sakai Chemical Industry Co., Ltd., average primary particle diameter = 290 nm) |
| 5 | Zinc oxide particles (trade name: Finex-50; manufactured by Sakai Chemical Industry Co., Ltd., average primary particle diameter = 20 nm) |
| 6 | Zinc oxide particles (trade name: Zincox Super F-1; manufactured by HakusuiTech Co., Ltd., specific surface area = 10 m$^2$/g, average primary particle diameter (*1) = 100 nm) |
| 7 | JIS standard zinc oxide (trade name: Zinc Oxide Type II; manufactured by HakusuiTech Co., Ltd., average primary particle diameter = 600 nm) |

(*1) A particle diameter converted from a specific surface area
(*2) A measured value of powder compressed at 10 MPa

Examples 1 to 4

209.0 Parts by mass of the isocyanate group-terminated polyurethane prepolymer B-1, 40 parts by mass of urethane particles (trade name: C-600; manufactured by Negami Chemical Industrial Co., Ltd.) as roughening particles, and 10 parts by mass, 23 parts by mass, 46 parts by mass, or 60 parts by mass of the zinc oxide particles No. 1 (trade name: Zincox Super F-3; manufactured by HakusuiTech Co., Ltd.) were added with respect to 100.0 parts by mass of the polyether polyol A-1 as materials for the surface layer 13, and then the contents were stirred and mixed.

Next, the mixture was dissolved in and mixed with methyl ethyl ketone (hereinafter abbreviated as "MEK") so that the total solid content ratio thereof became 30 mass %, followed by uniform dispersion with a sand mill.

Further, the resultant was diluted with methyl ethyl ketone so as to have a viscosity of 10 to 13 cps. Thus, 4 kinds of paints for forming surface layers were prepared.

Figure 3:
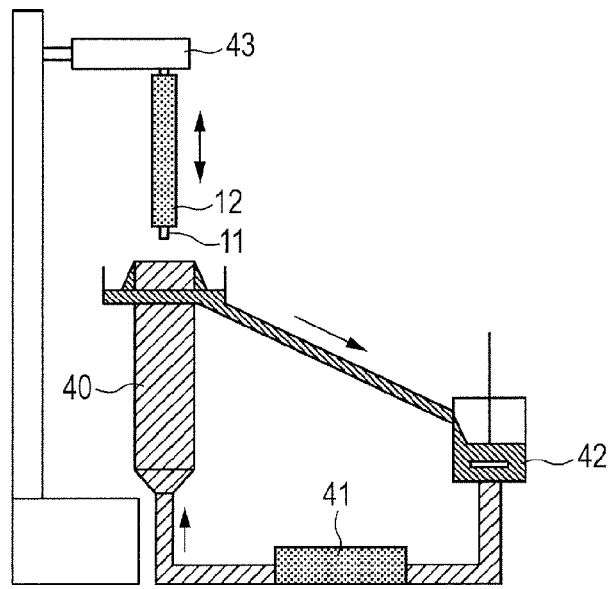
FIG. 3 is a schematic view illustrating an example of a liquid circulation-type dip coating apparatus for forming a surface layer of the developing member.

The surface of the elastic layer was coated with each of those paints for forming surface layers. A liquid circulation-type dip coating apparatus illustrated in FIG. 3 was used in the coating. A cylindrical dipping tank 40 in FIG. 3 has an inner diameter slightly larger than the outer diameter of a developing roller and has a depth larger than the length of the developing roller in its axial direction. The outer periphery at the upper end of the dipping tank 40 is provided with a cyclic liquid-receiving portion, which is connected to a stirring tank 42. In addition, the bottom portion of the dipping tank 40 is connected to the stirring tank 42. The paint in the stirring tank 42 is fed into the bottom portion of the dipping tank 40 by a liquid-feeding pump 41. The paint overflows from the upper end portion of the dipping tank and returns to the stirring tank 42 through the liquid-receiving portion on the outer periphery at the upper end of the dipping tank 40. The mandrel 11 provided with the elastic layer 12 is vertically fixed to a lifting unit 43, and is then dipped in the dipping tank 40, followed by being lifted up. Thus, the surface of the elastic layer 12 is coated with the paint. The paint with which the surface had been coated was dried, and then the surface layer 13 having a thickness of 20 μm was provided on the outer periphery of the elastic layer by subjecting the resultant to a heating treatment at a temperature of 150° C. for 1 hour. Thus, developing rollers 1 to 4 were obtained.

Examples 5 to 8

203.3 Parts by mass of the isocyanate group-terminated polyurethane prepolymer B-1 were added with respect to 100.0 parts by mass of a polyester diol (trade name: KURARAY POLYOL P-2010; manufactured by KURARAY CO., LTD.) as materials for a surface layer, and then the contents were stirred and mixed. Next, 10 parts by mass, 23 parts by mass, 46 parts by mass, or 60 parts by mass of the zinc oxide particles No. 2 were added to the mixture, and then the contents were stirred and mixed. Next, the mixture was dissolved in and mixed with methyl ethyl ketone (hereinafter abbreviated as "MEK") so that the total solid content ratio became 30 mass %, followed by uniform dispersion with a sand mill. Further, the resultant was diluted with methyl ethyl ketone so as to have a viscosity of 10 to 13 cps. Thus, 4 kinds of paints for forming surface layers were prepared. The surface layer was formed on the elastic layer by the same method as that of Example except that each of those paints for forming surface layers was used. Thus, developing rollers 5 to 8 according to Examples 5 to 8 were obtained.

Examples 9 to 12

36.3 Parts by mass of the isocyanate group-terminated polyurethane prepolymer B-1 were added with respect to 100.0 parts by mass of the hydroxyl group-terminated polyether urethane polyol A-2 as materials for a surface layer, and then the contents were stirred and mixed. Next, 10 parts by mass, 23 parts by mass, 46 parts by mass, or 60 parts by mass of the zinc oxide particles No. 3 were added to the mixture, and then the contents were stirred and mixed. Next, the mixture was dissolved in and mixed with methyl ethyl ketone (hereinafter abbreviated as "MEK") so that the total solid content ratio became 30 mass %, followed by uniform dispersion with a sand mill. Further, the resultant was diluted with methyl ethyl ketone so as to have a viscosity of 10 to 13 cps. Thus, 4 kinds of paints for forming surface layers were prepared. The surface layer was formed on the elastic layer by the same method as that of Example 1 except that each of those paints for forming surface layers was used. Thus, developing rollers 9 to 12 according to Examples 9 to 12 were obtained.

Examples 13 to 16

199.1 Parts by mass of the isocyanate group-terminated polyurethane prepolymer B-2 were added with respect to 100.0 parts by mass of a polyester diol (trade name: KURARAY POLYOL P-2010; manufactured by KURARAY CO., LTD.) as materials for a surface layer, and then the contents were stirred and mixed. Next, 10 parts by mass, 23 parts by mass, 46 parts by mass, or 60 parts by mass of the zinc oxide particles No. 4 were added to the mixture, and then the contents were stirred and mixed. Next, the mixture was dissolved in and mixed with methyl ethyl ketone (hereinafter abbreviated as "MEK") so that the total solid content ratio became 30 mass %, followed by uniform dispersion with a sand mill. Further, the resultant was diluted with methyl ethyl ketone so as to have a viscosity of 10 to 13 cps. Thus, 4 kinds of paints for forming surface layers were prepared. Developing rollers 13 to 16 according to Examples 13 to 16 were obtained by the same method as that of Example 1 except that those paints for forming surface layers were used, respectively.

Examples 17 to 20

36.7 Parts by mass of the isocyanate group-terminated polyurethane prepolymer B-2 were added with respect to 100.0 parts by mass of the hydroxyl group-terminated polyester urethane polyol A-3 as materials for a surface layer, and then the contents were stirred and mixed. Next, 10 parts by mass, 23 parts by mass, 46 parts by mass, or 60 parts by mass of the zinc oxide particles No. 5 were added to the mixture, and then the contents were stirred and mixed. Next, the mixture was dissolved in and mixed with methyl ethyl ketone (hereinafter abbreviated as "MEK") so that the total solid content ratio became 30 mass %, followed by uniform dispersion with a sand mill. Further, the resultant was diluted with methyl ethyl ketone so as to have a viscosity of 10 to 13 cps. Thus, 4 kinds of paints for forming surface layers were prepared. Developing rollers 17 to 20 according to Examples 17 to 20 were obtained by the same method as that of Example 1 except that those paints for forming surface layers were used, respectively.

Examples 21 to 24

39.7 Parts by mass of the isocyanate group-terminated polyurethane prepolymer B-3 were added with respect to 100.0 parts by mass of the hydroxyl group-terminated polyether urethane polyol A-2 as materials for a surface layer, and then the contents were stirred and mixed. Next, 10 parts by mass, 23 parts by mass, 46 parts by mass, or 60 parts by mass of the zinc oxide particles No. 6 were added to the mixture, and then the contents were stirred and mixed. Next, the mixture was dissolved in and mixed with methyl ethyl ketone (hereinafter abbreviated as "MEK") so that the total solid content ratio became 30 mass %, followed by uniform dispersion with a sand mill. Further, the resultant was diluted with methyl ethyl ketone so as to have a viscosity of 10 to 13 cps. Thus, 4 kinds of paints for forming surface layers were prepared. Developing rollers 21 to 24 according to Examples 21 to 24 were obtained by the same method as that of Example 1 except that those paints for forming surface layers were used, respectively.

Examples 25 to 28

68.8 Parts by mass of a polymeric MDI (trade name: Millionate MR-200; manufactured by Nippon Polyurethane Industry Co., Ltd.) were added with respect to 100.0 parts by mass of the polyether polyol A-1 as materials for a surface layer, and then the contents were stirred and mixed. Next, 10 parts by mass, 23 parts by mass, 46 parts by mass, or 60 parts by mass of the zinc oxide particles No. 7 were added to the mixture, and then the contents were stirred and mixed. Next, the mixture was dissolved in and mixed with methyl ethyl ketone (hereinafter abbreviated as "MEK") so that the total solid content ratio became 30 mass %, followed by uniform dispersion with a sand mill. Further, the resultant was diluted with methyl ethyl ketone so as to have a viscosity of 10 to 13 cps. Thus, 4 kinds of paints for forming surface layers were prepared. Developing rollers 25 to 28 according to Examples 25 to 28 were obtained by the same method as that of Example 1 except that those paints for forming surface layers were used, respectively.

Example 29

Materials for a surface layer were stirred and mixed in the same manner as in Examples 25 to 28. Next, 23 parts by mass of the zinc oxide particles No. 1 and 23 parts by mass of carbon black (trade name: MA230; manufactured by Mitsubishi Chemical Corporation) were added to the mixture, and then the contents were stirred and mixed. Next, the mixture was dissolved in and mixed with methyl ethyl ketone (hereinafter abbreviated as "MEK") so that the total solid content ratio became 30 mass %, followed by uniform dispersion with a sand mill. Further, the resultant was diluted with methyl ethyl ketone so as to have a viscosity of 10 to 13 cps. Thus, a paint for forming a surface layer was prepared. A developing roller 29 according to Example 29 was obtained by the same method as that of Example 1 except that the paint for forming a surface layer was used.

Table 4 shows the synthesis examples of Examples 1 to 29 described above.

TABLE 4

| Example | Developing roller No. | Polyol No. | Isocyanate No. | Isocyanate Blending amount (g) with respect to 100 (g) of polyol | Zinc oxide particles No. | Added particles Primary average particle diameter (nm) | Blending amount (g) with respect to 100 (g) of polyol |
|---|---|---|---|---|---|---|---|
| 1 | 1 | A-1 | B-1 | 209.0 | 1 | 50 | 10 |
| 2 | 2 | | | | | | 23 |
| 3 | 3 | | | | | | 46 |
| 4 | 4 | | | | | | 60 |
| 5 | 5 | "KURARAY POLYOL P-2010" | B-1 | 203.3 | 2 | 65 | 10 |
| 6 | 6 | | | | | | 23 |
| 7 | 7 | | | | | | 46 |
| 8 | 8 | | | | | | 60 |
| 9 | 9 | A-2 | B-1 | 36.3 | 3 | 30 | 10 |
| 10 | 10 | | | | | | 23 |
| 11 | 11 | | | | | | 46 |
| 12 | 12 | | | | | | 60 |
| 13 | 13 | "KURARAY POLYOL P-2010" | B-2 | 199.1 | 4 | 290 | 10 |
| 14 | 14 | | | | | | 23 |
| 15 | 15 | | | | | | 46 |
| 16 | 16 | | | | | | 60 |
| 17 | 17 | A-3 | B-2 | 36.7 | 5 | 20 | 10 |
| 18 | 18 | | | | | | 23 |
| 19 | 19 | | | | | | 46 |
| 20 | 20 | | | | | | 60 |
| 21 | 21 | A-2 | B-3 | 39.7 | 6 | 100 | 10 |
| 22 | 22 | | | | | | 23 |
| 23 | 23 | | | | | | 46 |
| 24 | 24 | | | | | | 60 |
| 25 | 25 | A-1 | MR200 | 68.8 | 7 | 600 | 10 |
| 26 | 26 | | | | | | 23 |
| 27 | 27 | | | | | | 46 |
| 28 | 28 | | | | | | 60 |
| 29 | 29 | A-1 | MR200 | 68.8 | 1 | 50 | 23 |

Comparative Example 1

82.5 Parts by mass of the isocyanate group-terminated polyurethane prepolymer B-2, 40 parts by mass of polyurethane particles (trade name: C-600; manufactured by Negami Chemical Industrial Co., Ltd.) as roughening particles, and 34.9 parts by mass of carbon black (trade name: MA230; manufactured by Mitsubishi Chemical Corporation) were added with respect to 100.0 parts by mass of a polytetramethylene glycol (trade name: PTMG3000, manufactured by Sanyo Chemical Industries, Ltd.) as materials for a surface layer, and then the contents were stirred and mixed. Next, the mixture was dissolved in and mixed with methyl ethyl ketone (hereinafter abbreviated as "MEK") so that the total solid content ratio became 30 mass %, followed by uniform dispersion with a sand mill. Further, the resultant was diluted with methyl ethyl ketone so as to have a viscosity of 10 to 13 cps. Thus, a paint for forming a surface layer was prepared. A developing roller 30 according to Comparative Example 1 was obtained by the same method as that of Example 1 except that the paint for forming a surface layer was used.

Comparative Example 2

40.6 Parts by mass of a polymeric MDI (trade name: Millionate MR-200; manufactured by Nippon Polyurethane Industry Co., Ltd.) and 23 parts by mass of the zinc oxide particles No. 2 were added with respect to 100.0 parts by mass of a polyester diol (trade name: Nippollan 4010; manufactured by Nippon Polyurethane Industry Co., Ltd.) as materials for a surface layer, and then the contents were stirred and mixed. Next, the mixture was dissolved in and mixed with methyl ethyl ketone (hereinafter abbreviated as "MEK") so that the total solid content ratio became 30 mass %, followed by uniform dispersion with a sand mill. Further, the resultant was diluted with methyl ethyl ketone so as to have a viscosity of 10 to 13 cps. Thus, a paint for forming a surface layer was prepared. A developing roller 31 according to Comparative Example 2 was obtained by the same method as that of Example 1 except that the paint for forming a surface layer was used.

Comparative Example 3

26.8 Parts by mass of a polymeric MDI (trade name: Millionate MR-200; manufactured by Nippon Polyurethane Industry Co., Ltd.) were added with respect to 100.0 parts by mass of a polytetramethylene glycol (trade name: PTMG3000, manufactured by Sanyo Chemical Industries, Ltd.) as materials for a surface layer, and then the contents were stirred and mixed. Further, 21.9 parts by mass of carbon black (trade name: MA230; manufactured by Mitsubishi Chemical Corporation) were added to the mixture, and then the contents were stirred and mixed. Next, the mixture was dissolved in and mixed with methyl ethyl ketone (hereinafter abbreviated as "MEK") so that the total solid content ratio became 30 mass %, followed by uniform dispersion with a sand mill. Further, the resultant was diluted with methyl ethyl ketone so as to have a viscosity of 10 to 13 cps. Thus, a paint for forming a surface layer was prepared. A developing roller 32 according to Comparative Example 3 was obtained by the same method as that of Example 1 except that the paint for forming a surface layer was used.

Comparative Example 4

56.0 Parts by mass of a modified isocyanate TDI (trade name: Sumidur T-80; manufactured by Sumitomo Bayer Urethane Co., Ltd.) were added with respect to 100 parts by mass of a hydroxyl group-terminated liquid polyolefin (trade name: Epol, molecular weight: 2,500; Idemitsu Kosan Co., Ltd.) as materials for a surface layer, and then the contents were stirred and mixed. Next, 23 parts by mass of acetylene black (trade name: DENKA BLACK; manufactured by DENKI KAGAKU KOGYO KABUSHIKI KAISHA) were added to the mixture, and then the contents were stirred and mixed. Next, the mixture was dissolved in and mixed with methyl ethyl ketone (hereinafter abbreviated as "MEK") so that the total solid content ratio became 30 mass %, followed by uniform dispersion with a sand mill. Further, the resultant was diluted with methyl ethyl ketone so as to have a viscosity of 10 to 13 cps. Thus, a paint for forming a surface layer was prepared. A developing roller 33 according to Comparative Example 4 was obtained by the same method as that of Example 1 except that the paint for forming a surface layer was used.

Table 5 shows the synthesis examples of Comparative Examples 1 to 4 described above.

TABLE 5

| Comparative Example | Developing roller No. | Polyol species | Isocyanate No. | Isocyanate Blending amount (g) with respect to 100 (g) of polyol | Zinc oxide particles No. | Added particles Primary average particle diameter (nm) | Added particles Blending amount (g) with respect to 100 (g) of polyol |
|---|---|---|---|---|---|---|---|
| 1 | 30 | "PTMG3000" | B-2 | 82.5 | — | — | — |
| 2 | 31 | "Nippollan 4010" | "Millionate MR-200" | 40.6 | 2 | 65 | 23 |
| 3 | 32 | "PTMG3000" | | 26.8 | — | — | — |
| 4 | 33 | "Epol" | "Sumidur T-80" | 56.0 | — | — | — |

The developing rollers 1 to 33 of Examples 1 to 29 and Comparative Examples 1 to 4 obtained as described above were each evaluated for the following items.

It should be noted that a laser printer (trade name: HP Colour LaserJet CP3525dn Printer; manufactured by Hewlett-Packard Japan, Ltd.) used in the evaluations is a machine for vertically outputting A4 paper and outputs recording media at a speed of 30 ppm. In addition, the contact pressure of a developing roller against a toner amount-regulating blade and its penetration amount were set so that a toner carrying amount on the developing roller was 0.40 mg/cm$^2$.

Evaluation 1

Evaluation for Fogging Under High-Temperature, High-Humidity Environment

An evaluation for fogging under a high-temperature, high-humidity environment was performed as described below.

Each of the developing rollers according to the respective examples and comparative examples was incorporated as a developing roller into a cartridge of a laser printer (trade name: HP Colour LaserJet CP3525dn Printer; manufactured by Hewlett-Packard Japan, Ltd.). The cartridge was mounted on the laser printer, and then an electrophotographic image was output under an environment having a temperature of 30° C. and a humidity of 85% RH.

Specifically, a 1% printed material of all colors (4 colors, i.e., yellow, cyan, magenta, and black) was output on 6,000 sheets, and then a solid white image was output on 1 sheet. The reflection density of the resultant solid white image was measured by a photovoltaic reflection densitometer (trade name: TC-6DS/A; manufactured by Tokyo Denshoku Co., Ltd.) with respective filters (3 colors, i.e., amber, green, and blue). A difference between the measured result and the reflection density of an unprinted portion was defined as fogging (%) and evaluated by the following criteria. Table 6 shows the results of the evaluation.

A: The total of the values measured with the respective filters is less than 4.5%.

B: The total of the values measured with the respective filters is 4.5% or more and less than 6.0%.

C: The total of the values measured with the respective filters is 6.0% or more.

Evaluation 2

Evaluation for Filming Under Low-Temperature, Low-Humidity Environment

A 1% printed material of all colors was output on 6,000 sheets in the same manner as in the section (1) under an environment having a temperature of 15° C. and a humidity of 10% RH. After that, the used developing roller was taken out of the cartridge and then the toner adhering onto the surface of the developing roller was removed by air blowing. After that, the toner with which the surface of the roller was filmed was peeled off with tape and then the density of the tape was measured with a spectral densitometer (trade name: 504 Spectral Densitometer; manufactured by X-Rite). The result was evaluated as described below. Table 6 shows the results of the evaluation.

A: The total of the measured values for the densities of all colors is less than 0.30.

B: The total of the measured values for the densities of all colors is 0.30 or more and less than 0.50.

C: The total of the measured values for the densities of all colors is 0.50 or more.

Evaluation 3

Evaluation for Blade Bias Leak

An evaluation for a blade bias leak was performed by the following method.

A black cartridge was reconstructed so that a desired voltage could be applied from the outside to the toner amount-regulating blade of the cartridge. Each of the developing rollers 1 to 33 was mounted in the cartridge, the cartridge was mounted onto the main body of the laser printer, and a halftone image was formed under an environment having a temperature of 25° C. and a humidity of 50% RH.

At that time, a halftone electrophotographic image was formed by applying a voltage to the toner amount-regulating blade so that a potential difference between the voltage and a voltage applied to the developing roller (voltage applied to the toner amount-regulating blade-voltage applied to the developing roller, hereinafter referred to as "ΔV") adopted a predetermined value. The resultant electrophotographic image was visually observed to confirm the presence or absence of the occurrence of a horizontal streak resulting from the blade bias leak. Table 7-1 and Table 7-2 show the results of the states of occurrence of the horizontal streak at respective ΔV's. It should be noted that in Table 7-1 and Table 7-2, Symbol "o" means that the occurrence of the horizontal streak resulting from the blade bias leak was not observed in the electrophotographic image, and Symbol "x" means that the occurrence of the horizontal streak resulting from the blade bias leak was observed in the electrophotographic image.

Further, a comprehensive evaluation was performed according to the following criteria;

Rank A: The occurrence of the horizontal streak cannot be observed at a ΔV of −300 V.

Rank B: The occurrence of the horizontal streak can be observed at a ΔV in the range of more than −300 V and less than −200 V.

Rank C: The occurrence of the horizontal streak can be observed at a ΔV in excess of −200 V.

TABLE 6

| | | Developing roller No. | (Evaluation 1) Result of measurement | Ranking | (Evaluation 2) Result of measurement | Ranking |
|---|---|---|---|---|---|---|
| Example | 1 | 1 | 4.50 | B | 0.146 | A |
| | 2 | 2 | 4.04 | A | 0.180 | A |
| | 3 | 3 | 4.54 | B | 0.170 | A |
| | 4 | 4 | 3.66 | A | 0.201 | A |
| | 5 | 5 | 3.44 | A | 0.215 | A |
| | 6 | 6 | 3.94 | A | 0.290 | A |
| | 7 | 7 | 3.34 | A | 0.397 | B |
| | 8 | 8 | 3.66 | A | 0.183 | A |
| | 9 | 9 | 2.70 | A | 0.157 | A |
| | 10 | 10 | 4.48 | A | 0.222 | A |
| | 11 | 11 | 2.26 | A | 0.242 | A |
| | 12 | 12 | 3.52 | A | 0.203 | A |
| | 13 | 13 | 3.36 | A | 0.261 | A |
| | 14 | 14 | 4.66 | B | 0.273 | A |
| | 15 | 15 | 4.70 | B | 0.317 | B |
| | 16 | 16 | 4.04 | A | 0.235 | A |
| | 17 | 17 | 5.10 | B | 0.172 | A |
| | 18 | 18 | 2.80 | A | 0.334 | B |
| | 19 | 19 | 4.06 | A | 0.419 | B |
| | 20 | 20 | 3.24 | A | 0.293 | A |
| | 21 | 21 | 3.82 | A | 0.473 | B |
| | 22 | 22 | 2.72 | A | 0.440 | B |
| | 23 | 23 | 3.66 | A | 0.481 | B |
| | 24 | 24 | 4.54 | B | 0.374 | B |
| | 25 | 25 | 2.94 | A | 0.155 | A |
| | 26 | 26 | 3.78 | A | 0.167 | A |
| | 27 | 27 | 4.18 | A | 0.164 | A |
| | 28 | 28 | 3.98 | A | 0.160 | A |
| | 29 | 29 | 2.54 | A | 0.174 | A |
| Comparative Example | 1 | 30 | 4.34 | A | 0.182 | A |
| | 2 | 31 | 6.27 | C | 0.582 | C |
| | 3 | 32 | 5.98 | B | 0.563 | C |
| | 4 | 33 | 2.23 | A | 0.747 | C |

TABLE 7-1

| | | Developing roller No. | ΔV (voltage applied to toner amount-regulating blade-voltage applied to developing roller) | | | | | | | | | | | | | | | Comprehensive evaluation |
|---|---|---|---|---|---|---|---|---|---|---|---|---|---|---|---|---|---|
| | | | −98 | −125 | −149 | −176 | −200 | −223 | −251 | −274 | −300 | −325 | −349 | −376 | −400 | −451 | −502 | |
| Example | 1 | 1 | o | o | o | o | o | o | o | o | o | o | x | x | x | x | x | A |
| | 2 | 2 | o | o | o | o | o | o | o | o | o | o | o | o | o | o | x | A |
| | 3 | 3 | o | o | o | o | o | o | o | o | o | o | o | o | o | o | x | A |
| | 4 | 4 | o | o | o | o | o | o | o | o | o | o | o | o | x | x | x | A |

TABLE 7-1-continued

| Developing roller No. | -98 | -125 | -149 | -176 | -200 | -223 | -251 | -274 | -300 | -325 | -349 | -376 | -400 | -451 | -502 | Comprehensive evaluation |
|---|---|---|---|---|---|---|---|---|---|---|---|---|---|---|---|---|
| 5 | ○ | ○ | ○ | ○ | ○ | ○ | ○ | ○ | ○ | ○ | ○ | x | x | x | x | A |
| 6 | ○ | ○ | ○ | ○ | ○ | ○ | ○ | ○ | ○ | ○ | ○ | ○ | ○ | ○ | ○ | A |
| 7 | ○ | ○ | ○ | ○ | ○ | ○ | ○ | ○ | ○ | ○ | ○ | ○ | ○ | ○ | ○ | A |
| 8 | ○ | ○ | ○ | ○ | ○ | ○ | ○ | ○ | ○ | ○ | ○ | x | x | x | x | A |
| 9 | ○ | ○ | ○ | ○ | ○ | ○ | ○ | x | x | x | x | x | x | x | x | B |
| 10 | ○ | ○ | ○ | ○ | ○ | ○ | ○ | ○ | ○ | ○ | ○ | ○ | ○ | ○ | ○ | A |
| 11 | ○ | ○ | ○ | ○ | ○ | ○ | ○ | ○ | ○ | ○ | ○ | ○ | ○ | ○ | x | A |
| 12 | ○ | ○ | ○ | ○ | ○ | ○ | x | x | x | x | x | x | x | x | x | B |
| 13 | ○ | ○ | ○ | ○ | ○ | ○ | ○ | ○ | ○ | ○ | ○ | ○ | ○ | ○ | ○ | A |
| 14 | ○ | ○ | ○ | ○ | ○ | ○ | ○ | ○ | ○ | ○ | ○ | ○ | ○ | ○ | ○ | A |
| 15 | ○ | ○ | ○ | ○ | ○ | ○ | ○ | ○ | ○ | ○ | x | x | x | x | x | A |
| 16 | ○ | ○ | ○ | ○ | ○ | ○ | ○ | x | x | x | x | x | x | x | x | B |
| 17 | ○ | ○ | ○ | ○ | ○ | ○ | x | x | x | x | x | x | x | x | x | B |
| 18 | ○ | ○ | ○ | ○ | ○ | ○ | ○ | ○ | ○ | ○ | ○ | ○ | ○ | ○ | x | A |
| 19 | ○ | ○ | ○ | ○ | ○ | ○ | ○ | ○ | ○ | ○ | ○ | ○ | ○ | ○ | ○ | A |
| 20 | ○ | ○ | ○ | ○ | ○ | x | x | x | x | x | x | x | x | x | x | B |
| 21 | ○ | ○ | ○ | ○ | ○ | ○ | ○ | ○ | ○ | ○ | ○ | ○ | ○ | ○ | x | A |
| 22 | ○ | ○ | ○ | ○ | ○ | ○ | ○ | ○ | ○ | ○ | ○ | ○ | ○ | x | x | A |
| 23 | ○ | ○ | ○ | ○ | ○ | ○ | ○ | ○ | ○ | ○ | ○ | ○ | ○ | x | x | A |
| 24 | ○ | ○ | ○ | ○ | ○ | ○ | ○ | ○ | x | x | x | x | x | x | x | A |
| 25 | ○ | ○ | ○ | ○ | ○ | ○ | ○ | ○ | ○ | ○ | ○ | ○ | ○ | ○ | ○ | A |
| 26 | ○ | ○ | ○ | ○ | ○ | ○ | ○ | ○ | ○ | ○ | ○ | ○ | ○ | ○ | ○ | A |
| 27 | ○ | ○ | ○ | ○ | ○ | ○ | ○ | ○ | x | x | x | x | x | x | x | B |
| 28 | ○ | ○ | ○ | ○ | ○ | ○ | ○ | ○ | ○ | ○ | x | x | x | x | x | A |
| 29 | ○ | ○ | ○ | ○ | ○ | ○ | x | x | x | x | x | x | x | x | x | B |

TABLE 7-2

| | | Developing roller No. | -98 | -125 | -149 | -176 | -200 | -223 | -251 | -274 | -300 | -325 | -349 | -376 | -400 | -451 | -502 | Comprehensive evaluation |
|---|---|---|---|---|---|---|---|---|---|---|---|---|---|---|---|---|---|---|
| Comparative Example | 1 | 30 | ○ | ○ | ○ | x | x | x | x | x | x | x | x | x | x | x | x | C |
| | 2 | 31 | ○ | ○ | ○ | ○ | ○ | ○ | ○ | ○ | ○ | x | x | x | x | x | x | A |
| | 3 | 32 | ○ | ○ | x | x | x | x | x | x | x | x | x | x | x | x | x | C |
| | 4 | 33 | ○ | x | x | x | x | x | x | x | x | x | x | x | x | x | x | C |

The polyurethane in the surface layer of each of the developing rollers 1 to 29 has at least one of the structures according to the items (A) and (B) between adjacent urethane bonds.

Accordingly, the occurrence of the fogging under the high-temperature, high-humidity environment is suppressed and the occurrence of the filming under the low-temperature, low-humidity environment is suppressed.

Further, the zinc oxide particles were dispersed in the surface layer of each of the developing rollers 1 to 29, and hence an image was able to be output without problems even when a high voltage was applied to the toner amount-regulating blade.

On the other hand, none of the developing rollers 31 to 33 had the structures according to the items (A) and (B) to be incorporated into the surface layer of the present invention. Accordingly, under the low-temperature, low-humidity environment, the hardness of the surface layer increased and the occurrence of the filming was remarkable. In addition, the surface layer of each of the developing rollers 31 and 32 had a high coefficient of water absorption. Accordingly, under the high-temperature, high-humidity environment, charge-providing property for toner was low and the occurrence of the fogging was observed. Further, the zinc oxide particles to be dispersed in the surface layer of the present invention were absent in each of the developing rollers 30, 32, and 33. Accordingly, when a high voltage was applied to the toner amount-regulating blade, the resultant image involved the following problem: the occurrence of the horizontal streak resulting from the leak was observed.

REFERENCE SIGNS LIST 1 developing roller
7 toner-supplying roller
9 toner amount-regulating blade
10a-10d image forming portions (for respective colors)
11 mandrel
12 elastic layer
13 surface layer
21 electrophotographic photosensitive member (photosensitive drum)
22 process cartridge
23 toner
24 toner container
25 laser light
26 charging member
27 waste toner container
28 cleaning blade
29 fixing unit
30 driver roller
31 transfer roller
32 bias power source
33 tension roller
34 conveying belt 35 driven roller
36 recording medium
37 sheet-feeding roller pair
38 adsorbing roller
39 peeling unit
40 dipping tank
41 liquid-feeding pump
42 stirring tank
43 lifting unit While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2012-033073, filed on Feb. 17, 2012 and No. 2013-023251, filed on Feb. 8, 2013, which are hereby incorporated by reference herein in their entirety.

What is claimed is:

1. A developing member, comprising:
a mandrel;
an elastic layer formed on a periphery of the mandrel; and
a surface layer covering a peripheral surface of the elastic layer,
wherein:
the surface layer contains
a polyurethane and
zinc oxide particles dispersed in the polyurethane; and
the polyurethane has, between two adjacent urethane bonds, one or both of structures selected from structures according to the following item (A) and the following item (B):
(A) a structure represented by the following structural formula (1), and one or both of structures selected from a structure represented by the following structural formula (2) and a structure represented by the following structural formula (3); and

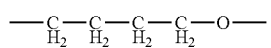    Structural formula (1)

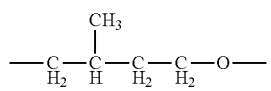    Structural formula (2)

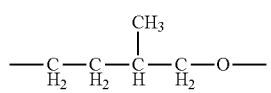    Structural formula (3)

(B) a structure represented by the following structural formula (4)

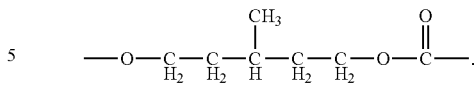    Structural formula (4)

2. The developing member according to claim 1, wherein a ratio between the number of moles of the structure represented by the structural formula (1), and a total sum of the number of moles of the structure represented by the structural formula (2) and the number of moles of the structure represented by the structural formula (3) in the polyurethane is 50:50 to 80:20.

3. The developing member according to claim 1, wherein the zinc oxide particles have an average primary particle diameter of 20 to 600 nm.

4. The developing member according to claim 3, wherein the zinc oxide particles comprise zinc oxide particles having an average primary particle diameter of 20 to 50 nm.

5. The developing member according to claim 4, wherein a content of the zinc oxide particles in the surface layer is 23 to 46 parts by mass with respect to 100.0 parts by mass of a resin solid content in the surface layer.

6. The developing member according to claim 3, wherein the zinc oxide particles comprise zinc oxide particles having an average primary particle diameter of 50 to 100 nm.

7. The developing member according to claim 6, wherein a content of the zinc oxide particles in the surface layer is 10 to 60 parts by mass with respect to 100.0 parts by mass of a resin solid content in the surface layer.

8. The developing member according to claim 3, wherein the zinc oxide particles comprise zinc oxide particles having an average primary particle diameter of 100 to 600 nm.

9. The developing member according to claim 8, wherein a content of the zinc oxide particles in the surface layer is 10 to 46 parts by mass with respect to 100.0 parts by mass of a resin solid content in the surface layer.

10. The developing member according to claim 1, wherein the polyurethane comprises a polyurethane obtained by causing a polyol having at least one of the structures according to the item (A) and the item (B), and an isocyanate compound to react with each other.

11. The developing member according to claim 1, wherein the elastic layer contains a silicone rubber.

12. An electrophotographic apparatus, comprising:
the developing member according to claims 1; and
an electrophotographic photosensitive member placed to be in contact with or close to the developing member.

13. A process cartridge, comprising:
the developing member according to claim 1; and
an electrophotographic photosensitive member placed to be in contact with or close to the developing member,
wherein the process cartridge is detachably mountable to a main body of an electrophotographic apparatus.

* * * * *